Oct. 19, 1971  N. D. ESAU  3,613,438
APPARATUS FOR FUEL EFFICIENCY TESTING
Filed Oct. 9, 1969  2 Sheets-Sheet 1
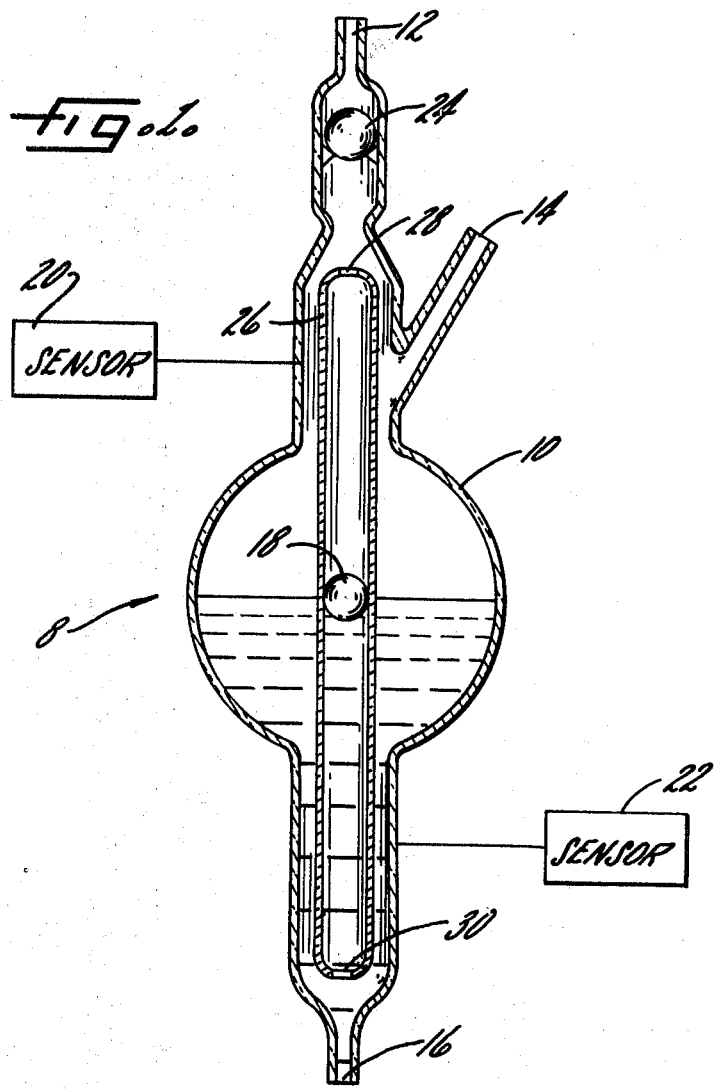
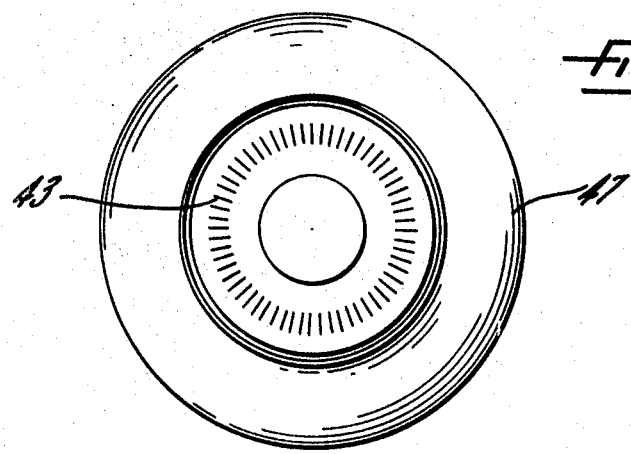
INVENTOR.
NORMAN D. ESAU
BY
Wolfe, Hubbard, Voit & Osann
ATTORNEYS.

Oct. 19, 1971  N. D. ESAU  3,613,438
APPARATUS FOR FUEL EFFICIENCY TESTING
Filed Oct. 9, 1969  2 Sheets-Sheet 2

INVENTOR.
NORMAN D. ESAU
BY
Wolfe, Hubbard, Voit & Osann
ATTORNEYS.

United States Patent Office 3,613,438
Patented Oct. 19, 1971

3,613,438
APPARATUS FOR FUEL EFFICIENCY TESTING
Norman D. Esau, Lansing, Ill., assignor to Standard Oil Company, Chicago, Ill.
Filed Oct. 9, 1969, Ser. No. 865,126
Int. Cl. G01l 3/24
U.S. Cl. 73—113                        8 Claims

ABSTRACT OF THE DISCLOSURE

A device for demonstrating the comparative performance of fuel uses in combination a volumetric measuring device, a fuel consuming device (such as an automobile), simple performance measuring devices and visual display indicators. The volumetric measuring device includes an outer reservoir and an inner tube for retaining fuel, and appropriate sensing means, such as photocells, whereby the position of a floatable object confined within the inner tube can be detected. The entrance for introducing fuel into the device is postioned such that entering fuel will not exert a downward force on the object within the inner tube.

DESCRIPTION OF THE INVENTION

This invention concerns an improved volumetric measuring device, and the use of such a device in combination with auxiliary apparatus to demonstratively illustrate the comparative efficiencies of liquid combustible fuels and of various operating conditions.

For many years, an intense competition among gasoline retailers has existed. As an outgrowth of this competition, many advertising techniques have been developed for the purpose of showing the comparative performance of various gasoline products. Of the many techniques, one of the more effective types has been the actual demonstrative comparison of the miles per gallon achievable with various gasolines. Of course, for such comparative tests to be meaningful, reliable measurements must be made with respect to both the distance traveled and the amount of fuel consumed.

I have now developed an apparatus whereby the consumer can directly observe the performance testing of several brands of gasoline under actual use conditions. In such a test an ordinary automobile is visibly mounted on a chassis dynamometer along with various auixilary equipment including distance indicating and fuel measuring devices. Thereafter, the distance traveled is determined for the same quantity of the various gasolines, and the related miles per gallon, or similar indicia, achievable with each gasoline calculated and displayed. Alternatively, I can use repeated samples of the same gasoline to demonstrate the effects of various operating conditions upon performance.

Demonstrations such as described above are particularly suitable for shopping centers. Quite obviously, in order to hold the audience's attention for the duration of the tests, the length of time consumed cannot be very long. Consequently, the test must be conducted on only small quantities of fuel. On the other hand, before a test can be made, steady state operation of the automobile with the test fuel must be achieved. Thus, a suitable measuring device for use in such demonstrations must be capable of accurately and quickly measuring a small quantity of fuel without being affected by continuous steady state operation of the automobile prior to the taking of the actual fuel consumption measurement.

Accordingly, it is an object of the present invention to provide a device which can be used for the demonstrative testing of liquid fuel. It is a further object to provide an improved volumetric measuring device, which can be used in combination with the demonstrative testing device, which does not become air bound during filling, and in which volumetric measurement can be accurately and promptly made. It is a further object to provide such a device which can be filled from the top and while filling allow simultaneous withdrawal from the bottom; once filled the device can remain in the liquid fuel feed line until such time as a measurement is desired, at which time filling is halted and the measured volume accurately delivered. Other objets and advantages of the invention will become apparent upon reading the following detailed description and upon reference to the drawings, in which:

FIG. 1 is a schematic side elevation view of a preferred measuring device of the present invention;

FIG. 3 is an elevation view of an automobile wheel suitably adapted for this service.

Figure 2:
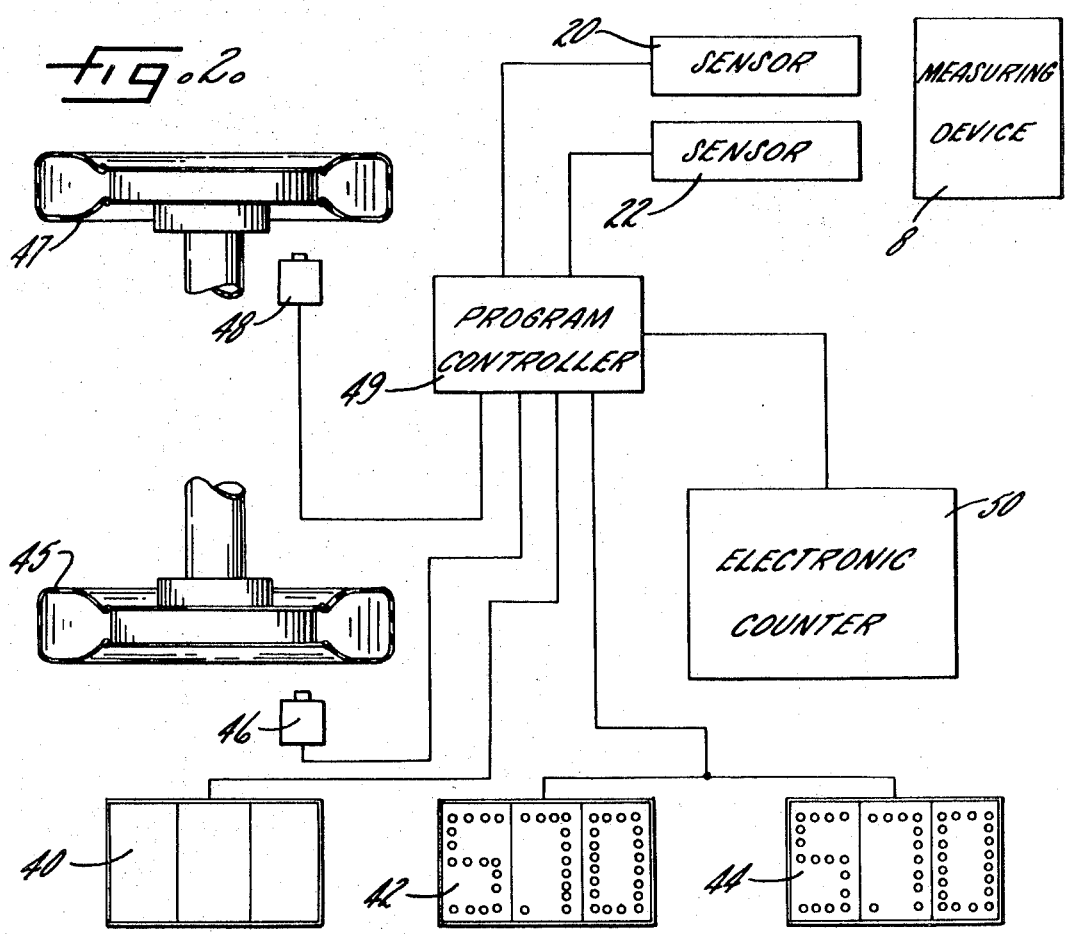
FIG. 2 is a detailed block diagram illustrating the manner in which demonstrative comparative testing of fuel can be accomplished in association with an automobile.

While the invention will be described in connection with a preferred embodiment, it will be understood that I do not intend to limit the invention to that embodiment. On the contrary, I intend to cover all alternatives, modifications and equivalents as may be included within the spirit and scope of the invention.

Referring to FIG. 1, there is illustrated a preferred embodiment of the measuring device of the present invention. The measuring device, generally indicated as 8, comprises an outer reservoir 10 having a top air vent 12, a side entrance 14 for introducing liquid, and a bottom exit 16 for discharging liquid. Preferably, in order to permit closing of the device after it is filled with liquid, a check valve 24 is provided to operate in association with the top air vent 12.

To allow measurement of the volume of liquid, a liquid level indicator object 18, e.g., a ball, is provided. The indicator object should have a specific gravity which is less than the liquid to be measured. The position of the indicator object within the device can be determined by any conventional sensing means, schematically illustrated at 20 and 22. When comparing fuels, the volume of liquid retained by the device between the sensing means should be known. However, when various operating conditions are being compared the volume need not be known, but it must be constant.

In previous top-filling devices using indicator objects and sensing means, it was discovered that, during filling, incoming liquid flowing through the device would exercise a force on the indicator object causing the object to remain at a position of equilibrium between the downward force of the flowing liquid and the buoyancy force of the object. This result is aggravated when some of the fluid is withdrawn from these devices during the filling operation in order to keep the engine running, e.g., in order to achieve steady state operation. In previous devices the object was not in a proper position for measurement when the liquid entrance was closed, and as a result, accurate measurements could not be made.

To obviate this improper position, and in accordance with one feature of the present invention, there is provided a retaining means for the object which is in communication with the liquid contained in the other tube. To this end, an inner tube 26 is provided which has openings 28 and 30 at both ends. The tube 26 is secured within the outer reservoir and is complementally dimensioned to allow the object 18 to freely traverse the tube length. The ends 28 and 30 of the tube 26 are partially closed to confine the object within the inner tube.

Furthermore, and in accordance with another feature of the present invention, the side entrance 14 of the outer reservoir 10 is disposed between the ends 28 and 30 of the inner tube and, consequently, the object will not be subject to the force of the incoming liquid. As a result, during operation, the device will fill with liquid even though some of the liquid runs therethrough, and the object will always be at the top of the inner tube and above the top sensing means. Thus, when the side entrance is closed, the object will be in a position to direcly fall with the declining liquid level, and its position will accurately reflect the top level of the liquid in the device.

Additionally, with the above described arrangement of the inner tube and side entrance, premature closing of the chack valve 24 during initial filling can be prevented. With previous devices at high liquid flow rates, liquid was carried by outrushing air to the check valve, thus prematurely closing it and leaving the device airbound. With the present arrangement of inner tube and side liquid entrance, the liquid initially entering the device through side entrance 14 can be directed down one side of the annular space between the inner tube and outer tube. As the liquid rises, air escapes from the opposite side of the annular space and out the air vent; the vent being closed only when all of the air has been forced out of the device by liquid.

For purposes of illustrating a specific device of the present invention, and not by way of limitation, the total length of the outer reservoir is 24 inches, the diameter thereof at its largest point being 2½ inches and constricting to a diameter of 1 inch. The outer reservoir diameter at the check valve is 1 inch. The air vent, side entrance, and bottom exit have openings of ⅓ inch. The inner tube is 16 inches long with a diameter of ⅜ inch. The device is preferably made of a transparent material, such as glass; and the sensing means are preferably photoelectric cells. A suitable volume of liquid for test purposes, which is contained between the sensing means 20 and 22, is about 150 cubic centimeters.

A particularly effective manner in which the demonstrative comparison of liquid fuels can be made is illustrated in FIG. 2. FIG. 2 shows a block diagram of the-controlling, counting, and measuring components which are used in association with a fuel consuming device, such as an automobile, the back wheels of which are indicated as 45 and 47. As shown, there are three display indicators 40, 42 and 44. As will become apparent, the use of three indicators is only for ease in visual display, and as few as one or even more than three indicators could be used.

For the purpose of measuring the distance traveled, pulse generators 46 and 48 are positioned opposite the rear wheels 45 and 47. As set forth later, the generators are individually activated at different times during a comparative test. A preferred pulse generator is one which is responsive to reflected light and, when such is used, the automobile wheels 45 and 47 can be provided with marks 43 such as illustrated in FIG. 3. The marks are conveniently made of an adhesive material which reflects light, the light generally being provided from the pulse generators themselves. The marks are positioned such that a pulse will be generated when a mark passes in view of the generator. When only the number of wheel turns is to be displayed, a single wheel mark is sufficient. On the other hand, as hereinafter described, where a fuel efficiency parameter is to be displayed, a plurality of marks are generally used.

Referring again to FIG. 2, pulses from the pulse generators are fed into the reversible decimal counter 50 which contains power amplification and lamp coding means to drive the indicators 40, 42 and 44. In order to activate the pulse generators so that the counter will only be operative during the desired portion of the fuel measurement test, a program controller 49, such as a drum type sequence controller, is provided. The program controller 49 receives input signals from the photoelectric cell sensing means 20 and 22 and, in turn, activates and deactivates the pulse generators 46 and 48.

The arrangement illustrated in FIG. 2 is particularly suitable for illustrating the bonus performance, e.g., the bonus miles per tankful, which can be achieved with a particular sample fuel over a comparative fuel. For such a demonstration, the comparative fuel is first used. After steady state operation of the automobile is achieved, the fuel supply to the measuring device is shut off and the liquid level in the device begins to fall as consumption of fuel by the automobile continues. When the liquid level in the measuring device reaches a level opposite that of the top sensing means 20, the right rear wheel turn pulse generator 46 is activated. The right rear wheel contains a single mark and, thus, one pulse per wheel turn is generated and fed to the counter 50. The number of wheel turns are continuously recorded on the display indicator 40. When the fuel level falls to that of the bottom sensing means 22, the pulse generator 46 is deactivated.

Thereafter, the standard fuel is introduced into the display device and, after steady state operation is achieved, the fuel supply is again shut off. At this time, the indicator 40 still displays the number of wheel turns achieved with the comparative fuel. However, when using the standard fuel, the counter 50 is programmed such that, on activation by the top sensing means, the indicator 40 will not continue to record increasing wheel turns as signals from the pulse generator 46 are received, but rather will count backwards, thus subtracting wheel turns from the total number recorded for the comparative fuel. Quite obviously, if the standard fuel is more efficient than the comparative fuel, the indicator will reach zero before the fuel level reaches the bottom sensing means. Under such circumstances, the zero reading on the display indicator 40 deactivates the generator 46 and activates the pulse generator 48 associated with the left rear wheel. As hereinafter set forth, signals received from generator 48 are indicative of "bonus" performance.

As indicated previously, a plurality of wheel marks are ordinarily used when the pulses from the generator to the decimal counter are to be converted into a fuel efficiency parameter and not simply displayed as number of wheel turns. Accordingly, since signals from the generator 48 associated with rear wheel 47 are used to indicate "bonus" miles per tank full, rear wheel 47 contains a plurality of marks. The number of marks used should be such that each pulse from the generator 48 to the counter 50 indicates a decimal fraction of a bonus mile achievable with the sample fuel. As such, the appropriate number of marks is a function of the total fuel volume of the test automobile's tank, the volume of the measuring device between sensing means, and the distance traveled per wheel revolution. Where it is desired that each pulse represent 0.01 bonus miles per tank full, the following formula can be used to establish the number of marks and the related pulses per wheel turn:

$$\text{Number of marks} = 100 \times \frac{\text{miles}}{\text{wheel turn}} \times \frac{\text{volume of tank (gal.)}}{\text{volume of measuring device (gal.)}}$$

Thus, if the demonstration is conducted on an automobile with a 17.7 gallon fuel tank and a wheel size such that one wheel turn equals 0.00127 mile, the appropriate number of marks for various test fuel volumes is as follows:

| Test fuel volume (cc.): | Marks |
|---|---|
| 140 | 61 |
| 150 (0.0396 gal.) | 57 |
| 160 | 53 |
| 170 | 50 |

The pulses received by the counter 50 from the generator 48 are displayed on the indicators 42 and 44. By appropriate placement of a decimal point on the face of the indicators, the correct bonus mileage per tank full can be shown. For example, if the pulse generator 48 is activated by a zero reading on the indicator 40 while sufficient fuel remains in the measuring device above the bottom sensor to cause ten bonus wheel turns, the counter 50 will receive a total of 570 pulses (assuming a 150 cc. measuring device and consequently 57 wheel marks). This will be displayed, as shown by FIG. 2, as 5.70 bonus miles per tank full.

Figure 4:
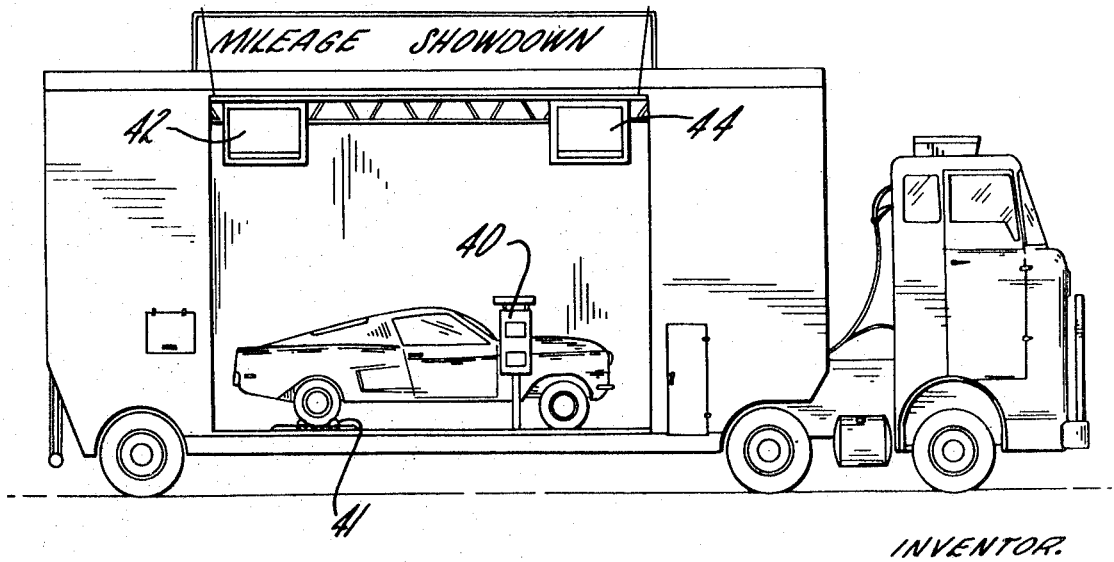
FIG. 4 is a pictorial illustration of a display unit for automobile fuel testing.

FIG. 4 illustrates an appropriate manner of using the device for a public demonstration. The function of display indicator 40, 42 and 44 have been described previously. Dynamometer 41 imposes a relatively heavy but fixed load on the automobile operating under fixed conditions.

I claim as my invention:

1. A volumetric liquid measuring device comprising an outer reservoir having a top air vent, a side entrance for introducing a liquid, and a bottom exit for discharging a liquid; an inner tube open on both ends positioned within said outer reservoir such that said side entrance of said outer reservoir is disposed between the open ends of said inner tube; an object confined within said inner tube and free to move therein which has a specific gravity less than the liquid to be measured; and sensing means whereby the position of the object within the inner tube can be detected at at least two different positions.

2. The device of claim 1 wherein said inner tube and outer reservoir are of transparent glass and said sensing means comprise photoelectric cells.

3. The device of claim 1 containing an air vent check valve.

4. The device of claim 3 wherein said inner tube and outer reservoir are of transparent glass and said sensing means comprise photoelectric cells.

5. In an apparatus useful for the measurement of fuel efficiency comprising means for converting liquid fuel to mechanical energy, means for measuring the energy so produced and means for measuring the volumetric amount of fuel consumed in producing the measured amount of energy; the improvement wherein the means for measuring the volumetric amount of fuel consumed comprises an outer reservoir having a top air vent, a side entrance for introducing the liquid fuel, and a bottom exit for discharging the liquid fuel; an inner tube open on both ends positioned within said outer reservoir such that said side entrance of said outer reservoir is disposed between the open ends of said inner tube; an object confined within said inner tube and free to move therein which has a specific gravity less than the liquid fuel to be measured; and sensing means whereby the position of the object within the inner tube can be detected at at least two different positions.

6. The apparatus of claim 5 wherein the fuel measuring means contains an air vent check valve.

7. The apparatus of claim 6 wherein said inner tube and outer reservoir are of transparent glass and said sensing means comprise photoelectric cells.

8. The apparatus of claim 7 wherein the means for converting liquid fuel to mechanical energy is an internal combustion engine of an automobile.

References Cited
UNITED STATES PATENTS

| | | | |
|---|---|---|---|
| 2,521,322 | 9/1950 | Baadte | 73—117 UX |
| 2,625,933 | 1/1953 | Salisburg | 73—223 UX |

JERRY W. MYRACLE, Primary Examiner

U.S. Cl. X.R.

73—117, 223, 308